United States Patent
Goodwin

(10) Patent No.: US 12,240,039 B2
(45) Date of Patent: Mar. 4, 2025

(54) SYSTEMS AND METHODS FOR MEASURING RADIATION EMITTED DURING A THREE-DIMENSIONAL PRINTING PROCESS

(71) Applicant: Nikon Corporation, Tokyo (JP)

(72) Inventor: Eric Peter Goodwin, Oro Valley, AZ (US)

(73) Assignee: NIKON CORPORATION, Tokyo (JP)

( * ) Notice: Subject to any disclaimer, the term of this patent is extended or adjusted under 35 U.S.C. 154(b) by 794 days.

(21) Appl. No.: 17/244,764

(22) Filed: Apr. 29, 2021

(65) Prior Publication Data

US 2022/0347751 A1 Nov. 3, 2022

(51) Int. Cl.
| | |
|---|---|
| *B22F 10/368* | (2021.01) |
| *B22F 10/28* | (2021.01) |
| *B22F 10/80* | (2021.01) |
| *B22F 12/30* | (2021.01) |
| *B22F 12/41* | (2021.01) |
| *B22F 12/90* | (2021.01) |
| *B33Y 10/00* | (2015.01) |
| *B33Y 30/00* | (2015.01) |
| *B33Y 50/00* | (2015.01) |
| *B22F 10/85* | (2021.01) |

(52) U.S. Cl.
CPC ............ *B22F 10/368* (2021.01); *B22F 10/28* (2021.01); *B22F 10/80* (2021.01); *B22F 12/30* (2021.01); *B22F 12/41* (2021.01); *B22F 12/90* (2021.01); *B33Y 10/00* (2014.12); *B33Y 30/00* (2014.12); *B33Y 50/00* (2014.12)

(58) Field of Classification Search
CPC ........ B22F 10/368; B22F 10/28; B22F 10/80; B22F 12/30; B22F 12/41; B22F 12/90; B22F 12/38; B22F 10/85; B33Y 10/00; B33Y 30/00; B33Y 50/00; B33Y 50/02; Y02P 10/25
USPC ......................................................... 700/118
See application file for complete search history.

(56) References Cited

U.S. PATENT DOCUMENTS

| | | | |
|---|---|---|---|
| 10,611,092 B2 * | 4/2020 | Buller | B23K 26/062 |
| 11,532,760 B2 * | 12/2022 | Sutcliffe | B23K 15/0026 |
| 2019/0339123 A1 * | 11/2019 | Farsad | G01N 21/73 |
| 2021/0268586 A1 | 9/2021 | Takeshita | |

* cited by examiner

*Primary Examiner* — Michael J Brown

(57) ABSTRACT

The problem of measuring the temperature of a 3D printing process is addressed by systems and methods that apply imaging spectrometry to measure blackbody radiation emitted before, during, or after a 3D printing process. The systems and methods utilize a pair of lenses, a field stop, and a wavelength separator to direct a plurality of wavelengths corresponding to the blackbody radiation to pixels of an optical detector. The plurality of wavelengths are analyzed by a controller to determine the temperature of the 3D printed component.

27 Claims, 5 Drawing Sheets

SYSTEMS AND METHODS FOR MEASURING RADIATION EMITTED DURING A THREE-DIMENSIONAL PRINTING PROCESS

RELATED APPLICATIONS

The present application is related to PCT application number PCT/US2020/040772, entitled "METROLOGY FOR ADDITIVE MANUFACTURING," filed on Jul. 2, 2020, which claims priority to U.S. Provisional Application No. 62/869,856, entitled "METROLOGY FOR ADDITIVE MANUFACTURING," filed on Jul. 2, 2019; and to PCT application number PCT/2018/067406, entitled "ROTATING ENERGY BEAM FOR THREE-DIMENSIONAL PRINTER," filed on Dec. 22, 2018, each of which is entirely incorporated herein by reference for all purposes.

BACKGROUND OF THE INVENTION

Certain three-dimensional (3D) printing systems and methods utilize directed energy (for instance, from a laser or an electron beam) to heat metal powders. By selectively heating different locations in successive layers of metal powders, a 3D printed metal part may be built layer by layer. Such 3D printing operations are often conducted in a vacuum or other gas-tight vessel. Development of new 3D printing processes, or optimization of existing 3D printing processes, often requires temperature measurements of all or a portion of the part or the environment in which the part is being built before, during, or after the heating process. Accordingly, presented herein are systems and methods for measuring blackbody radiation before, during, or after 3D printing processes.

BRIEF DESCRIPTION OF THE DRAWINGS

Various embodiments of the invention are disclosed in the following detailed description and the accompanying drawings.

DETAILED DESCRIPTION

Figure 1A:
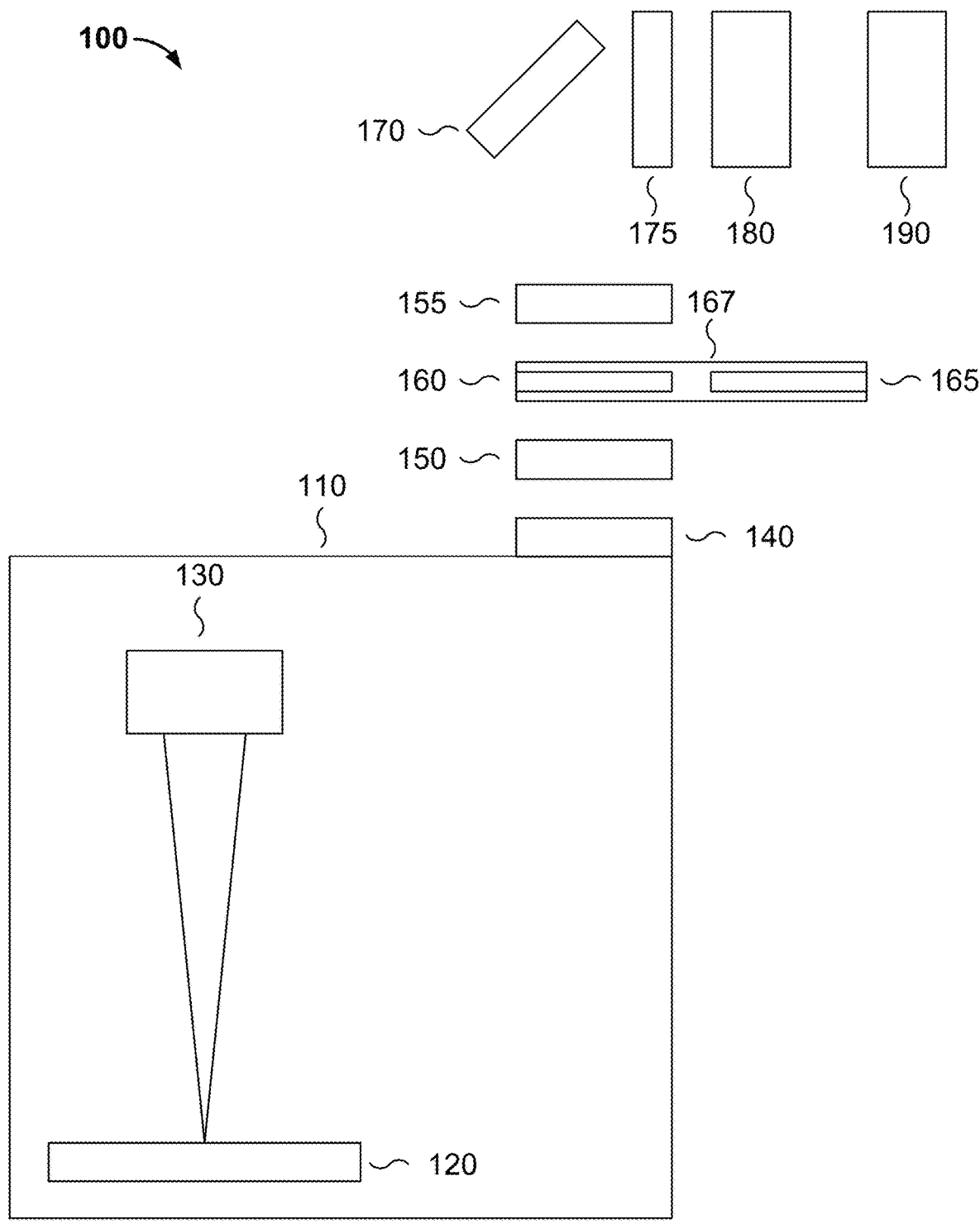
FIG. 1A shows a schematic depicting an exemplary system for measuring blackbody radiation emitted during a three-dimensional (3D) printing process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "or" shall convey both disjunctive and conjunctive meanings. For instance, the phrase "A or B" shall be interpreted to include element A alone, element B alone, and the combination of elements A and B.

Recent work in three-dimensional (3D) printing has allowed the production of additively manufactured metal parts having geometries that are difficult or impossible to manufacture using traditional subtractive manufacturing processes such as milling or lathing. Such 3D printed metal parts may have material properties (such as tensile strength, density, and the like) that are substantially similar to those of metal parts manufactured using the traditional subtractive manufacturing processes. Such 3D printing processes often utilize directed energy, such as laser light or an electron beam to selectively heat metal powders and thereby form layers of a metal part. These processes are often conducted in a vacuum or other gas-tight vessel. Such vessels are often formed from an optically opaque material such as stainless steel.

Development of new 3D printing processes, or optimization of existing 3D printing processes, often requires temperature measurements of all or a portion of the part or the environment in which the part is being built before, during, or after the heating process. Current approaches to measuring the temperature may be limited by the use of multiple cameras looking at similar locations but sensitive to different wavelengths, such that ratio pyrometry may be performed. Other approaches may utilize a single camera having sensitivity to a wider range of wavelengths and may be misled by spectral changes in emissivity, as such a camera may integrate indiscriminately over the entire range of wavelengths to which it is sensitive.

Accordingly, the problem of measuring the temperature of a 3D printing process is addressed by systems and methods that apply imaging spectrometry to measure blackbody radiation emitted before, during, or after a 3D printing process. The systems and methods utilize a pair of lenses, a field stop, and a wavelength separator to direct a plurality of wavelengths corresponding to the blackbody radiation to pixels of an optical detector. The plurality of wavelengths are analyzed by a controller to determine the temperature of the 3D printed component.

A system for measuring blackbody radiation emitted during a 3D printing process is disclosed here. The system generally comprises: a closed container; a 3D printing melt platform located within the closed container and configured to support the production of a 3D printed component during a 3D printing process; an energy source configured to direct energy to the 3D printing melt platform during the 3D printing process; an optical access port coupled to a wall of the closed container and configured to receive light comprising a plurality of wavelengths from the 3D printing melt platform; a first lens configured to receive the light comprising the plurality of wavelengths from the optical access port; a first field stop located substantially near an image plane of the first lens and configured to receive the light comprising the plurality of wavelengths from the first lens; a second lens configured to receive the light comprising the plurality of wavelengths from the first field stop; a wavelength separator configured to receive the light comprising the plurality of wavelengths from the second lens and to spatially separate the plurality of wavelengths; and an optical detector comprising a plurality of pixels, each pixel configured to receive a wavelength of the plurality of wavelengths. In some embodiments, the closed container comprises a gas-tight chamber. In some embodiments, the closed container comprises a pressure chamber. In some embodiments, the closed container comprises a vacuum chamber. In some embodiments, the 3D printing process is selected from the group consisting of: metal powder bed fusion, direct metal laser sintering, selective laser melting, and electron beam melting. In some embodiments, the energy source comprises a laser. In some embodiments, the energy source comprises an electron-beam. In some embodiments, the optical access port is located within the wall of the closed container. In some embodiments, the optical access port is coupled to the wall of the closed container by a flange. In some embodiments, the light comprising blackbody radiation emitted by the 3D printed component. In some embodiments, each wavelength of the plurality is within a range from 600 nanometers (nm) to 1,100 nm. In some embodiments, the first field stop comprises a spatial filter. In some embodiments, the system further comprises a dual-position stage coupled to the first field stop and to a second field stop, the dual-position stage configured: (i) to move the first field stop away from the image plane of the first lens and to move the second field stop substantially near the image plane of the first lens or (ii) to move the second field stop away from the image plane of the first lens and to move the first field stop substantially near the image plane of the first lens. In some embodiments, the wavelength separator comprises a diffraction grating or a prism. In some embodiments, the system further comprises a controller coupled to the optical detector and configured to determine a temperature of the 3D printed component based upon a plurality of signals, each signal received from one or more pixels of the optical detector. In some embodiment, the controller comprises: a processor; and a memory coupled with the processor, wherein the memory is configured to provide the processor with instructions which when executed cause the processor to determine the temperature based upon the plurality of signals. In some embodiments, the controller comprises: a processor configured to determine the temperature based upon the plurality of signals; and a memory coupled to the processor and configured to provide the processor with instructions to determine the temperature based upon the plurality of signals.

Further disclosed herein is a method for measuring blackbody radiation emitted during a 3D printing process. The method generally comprises: receiving light comprising a plurality of wavelengths from a 3D printing melt platform located within a closed container, the 3D printing melt platform configured to support the production of a 3D printed component during a 3D printing process; receiving the light comprising the plurality of wavelengths at a first lens through an optical access port coupled to a wall of the closed container; receiving the light comprising the plurality of wavelengths at a first field stop located substantially near an image plane of the first lens; receiving the light comprising the plurality of wavelengths at a second lens through the first field stop; spatially separating the plurality of wavelengths from the second lens; and detecting each wavelength of the plurality of wavelengths. In some embodiments, the method further comprises, prior to receiving the light comprising the plurality of wavelengths, directing energy to the 3D printing melt platform during the 3D printing process. In some embodiments, the method further comprises determining a temperature of the 3D printed component based upon the plurality of wavelengths.

FIG. 1A shows a schematic depicting a first exemplary system 100 for measuring blackbody radiation emitted during a 3D printing process. The system generally functions as a spectrometer in measuring the blackbody radiation. Thus, the system may be referred to herein as a spectrometer. In the example shown, the system 100 comprises a closed container 110. In some embodiments, the closed container comprises a gas-tight chamber. In some embodiments, the closed container comprises a pressure chamber. In some embodiments, the closed container comprises a vacuum chamber. In some embodiments, the closed container comprises a high vacuum chamber. In some embodiments, the closed container comprises an ultra-high vacuum chamber.

In the example shown, the system 100 comprises a 3D printing melt platform 120 located within the closed container. In some embodiments, the 3D printing melt platform is configured to support the production of a 3D printed component during a 3D printing process. In some embodiments, the 3D printing process comprises a metal bed fusion process, a direct metal laser sintering process, a selective laser melting process, or an electron beam melting process.

In the example shown, the system 100 comprises an energy source 130. In some embodiments, the energy source is located within the closed container. In some embodiments, the energy source is external to the closed container. In some embodiments, the energy source is configured to direct energy to the 3D printing melt platform during the 3D printing process. In some embodiments, the energy source comprises a laser. In some embodiments, the energy source comprises an electron beam. In some embodiments, the energy selectively heats different portions of a layer of metal powder located on the 3D printing melt platform. In some embodiments, the heating produces light emitted by the 3D printed component. In some embodiments, the light comprises blackbody radiation emitted by the 3D printed component. In some embodiments, the light comprises a plurality of wavelengths.

In the example shown, the system 100 comprises an optical access port 140 coupled to a wall of the closed container. In some embodiments, the optical access port is configured to receive the light from the 3D printing melt platform. In some embodiments, the optical access port is located within the wall of the closed container. In some embodiments, the optical access port is coupled to the wall of the closed container by a flange (such as a vacuum, high vacuum, or ultra-high vacuum flange). In some embodiments, the wall comprises a side wall of the closed container. In some embodiments, the wall comprises a top wall or lid of the closed container.

In the example shown, the system 100 comprises a first lens 150. In some embodiments, the first lens is configured to receive the light comprising the plurality of wavelengths from the first optical access port. In some embodiments, the first lens is external to the closed container.

In the example shown, the system 100 comprises a first field stop 160. In some embodiments, the first field stop is located substantially near an image plane of the first lens. In some embodiments, the first field stop is configured to receive the light comprising the plurality of wavelengths from the first lens. In some embodiments, the first field stop is external to the closed container. In some embodiments, the first field stop comprises a spatial filter.

In the example shown, the system 100 comprises a second lens 155. In some embodiments, the second lens is configured to receive the light comprising the plurality of wavelengths from the first field stop. In some embodiments, the second lens is external to the closed container.

In the example shown, the system 100 comprises a wavelength separator 170. In some embodiments, the wavelength separator is configured to spatially separate the plurality of wavelengths. In some embodiments, the wavelength separator is external to the closed container. In some embodiments, the wavelength separator comprises a diffraction grating or a prism.

In the example shown, the system 100 comprises a third lens 175. In some embodiments, the third lens is configured to receive the plurality of wavelengths from the wavelength separator. In some embodiments, the third lens is external to the closed container.

In the example shown, the system 100 comprises an optical detector 180. In some embodiments, the optical detector comprises a plurality of pixels. In some embodiments, each pixel is configured to receive a wavelength of the plurality of wavelengths. In some embodiments, the optical detector is external to the closed container. In some embodiments, the optical detector is configured to receive at least about 3, 4, 5, 6, 7, 8, 9, or more wavelengths. In some embodiments, the optical detector is configured to receive at most about 9, 8, 7, 6, 5, 4, 3, or fewer wavelengths. In some embodiments, the optical detector is configured to receive a number of wavelengths that is within a range defined by any two of the preceding values. In some embodiments, each wavelength received by the pixels of the optical detector is at least about 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, 1,010 nm, 1,020 nm, 1,030 nm, 1,040 nm, 1,050 nm, 1,060 nm, 1,070 nm, 1,080 nm, 1,090 nm, 1,100 nm, 1,110 nm, 1,120 nm, 1,130 nm, 1,140 nm, 1,150 nm, 1,160 nm, 1,170 nm, 1,180 nm, 1,190 nm, 1,200 nm, or more. In some embodiments, each wavelength received by the pixels of the optical detector is at most about 1,200 nm, 1,190 nm, 1,180 nm, 1,170 nm, 1,160 nm, 1,150 nm, 1,140 nm, 1,130 nm, 1,120 nm, 1,110 nm, 1,100 nm, 1,090 nm, 1,080 nm, 1,070 nm, 1,060 nm, 1,050 nm, 1,040 nm, 1,030 nm, 1,020 nm, 1,010 nm, 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, or less. In some embodiments, each wavelength received by the pixels of the optical detector is within a range defined by any two of the preceding values. For example, in some embodiments, each wavelength received by the pixels of the optical detector is within a range from about 500 nm to 1,200 nm, or 600 nm to 1,100 nm. In some embodiments, an upper bound of the range of wavelengths received by the pixels of the optical detector is less than twice a lower bound of the range of wavelengths received by the pixels of the optical detector. In some embodiments, such a restriction on the upper and lower bounds prevents wavelength mixing due to second order diffraction.

In the example shown, the system 100 comprises a controller 190. In some embodiments, the controller is coupled to the optical detector. In some embodiments, the controller is configured to determine a temperature of the 3D printed component based upon a plurality of signals, each signal received from one or more pixels of the optical detector. In some embodiments, the controller is configured to determine the temperature of the 3D printed component by fitting the plurality of signals to Planck's law of blackbody radiation or by fitting the peak of the plurality of signals to Wien's law.

For example, after detecting the plurality of signals, a magnitude of each signal of the plurality may be adjusted based on a spectral responsivity of the optical detector at the wavelength associated with the signal, based on the spectral transmission of the system, or based on any other considerations that may factor into a wavelength-dependent response of the system. In some embodiments, once such adjustments have been made, a curve that relates the magnitude of each signal of the plurality to an associated wavelength is generated. In some embodiments, this curve is fitted to Planck's law according to Equation (1):

$$B_\lambda(\lambda, T) = \varepsilon(\lambda) \frac{2hc^2}{\lambda^5} \left( \frac{1}{\exp(\frac{hc}{\lambda k_B T}) - 1} \right) \quad (1)$$

Here, $B_\lambda(\lambda, T)$ is the wavelength- and temperature-dependent blackbody radiation, $\varepsilon(\lambda)$ is the wavelength-dependent spectral emissivity, h is Planck's constant, c is the speed of light, $\lambda$ is the wavelength, $k_B$ is Boltzmann's constant, and T is the temperature. For a true blackbody, $\varepsilon(\lambda)$ has unity value for all wavelengths. Thus, in some embodiments, a rough estimate of the temperature is obtained by assuming $\varepsilon(\lambda)$ to have unity value and fitting the curve to Planck's law. In some embodiments, this rough estimate may be sufficient. For example, in some embodiments, this rough estimate may yield an estimated temperature that is different from an actual temperature of the 3D printed component by at least about 1%, 2%, 3%, 4%, 5%, 6%, 7%, 8%, 9%, 10%, 15%, 20%, 25%, or more. In some embodiments, this rough estimate may yield an estimated temperature that is different from the actual temperature by at most about 25%, 20%, 15%, 10%, 9%, 8%, 7%, 6%, 5%, 4%, 3%, 2%, 1%, or less. In some embodiments, this rough estimate may yield an estimated temperature that is different from the actual temperature by an amount that is within a range defined by any two of the preceding values.

However, many objects are not ideal blackbodies and $\epsilon(\lambda)$ does not have unity value for many objects. Thus, in some embodiments, it may be difficult to estimate the wavelength-dependent spectral emissivity. Over a narrow enough bandwidth, the hemispherical radiance calculated from Planck's Law simplifies to Equation (2):

$$L_{\lambda,b}(\lambda, T) = \frac{C_1}{\lambda^5 \left(\exp\left(\frac{C_2}{\lambda T}\right) - 1\right)} \quad (2)$$

Here, $L_{\lambda,b}(\lambda, T)$ is the wavelength- and temperature-dependent blackbody spectral radiance, $C_1 = 1.1911 \times 10^8$ is the first radiation constant, $\lambda$ is the wavelength, $C_2 = 1.4388 \times 10^4$ is the second radiation constant, and T is the temperature. In some embodiments, the curve that relates the magnitude of each signal of the plurality to an associated wavelength is fitted to Planck's law according to Equation (2). In some embodiments, one or more signals of the plurality of signals are integrated and fitted to Equation (1) or Equation (2).

In order to further reduce uncertainties, in some embodiments, ratios between the signals associated with different wavelengths are used to determine the overall shape of the Planck curve associated with the plurality of signals. In some embodiments, this measured overall shape is compared with a library of Planck curves with a variety of different temperatures. Such a procedure may be referred to as ratio pyrometry. In some embodiments, ratio pyrometry yields the temperature associated with the Planck curve from the library that best corresponds with the measured overall shape.

Ratio pyrometry may utilize signals associated with any number of wavelengths. For example, in some embodiments, ratio pyrometry utilizes signals associated with two wavelengths. Equation (2) can be modified to account for the wavelength-dependent response of the optical system and the wavelength-dependent response of the optical detector to give the signals associated with each wavelength:

$$S_1(T) = \epsilon(\lambda_1) K(\lambda_1) R(\lambda_1) \lambda_1^{-5} \exp\left(\frac{-C_2}{\lambda_1 T}\right) \quad (3)$$

$$S_2(T) = \epsilon(\lambda_2) K(\lambda_2) R(\lambda_2) \lambda_2^{-5} \exp\left(\frac{-C_2}{\lambda_2 T}\right) \quad (4)$$

$S_1$ and $S_2$ are the signals associated with the first and second wavelengths $\lambda_1$ and $\lambda_2$, respectively. $\epsilon(k\lambda_1)$, $K(\lambda_1)$, and $R(\lambda_1)$ are emissivity, optical system response, and optical detector response, respectively, at the first wavelength. $\epsilon(\lambda_2)$, $K(\lambda_2)$, and $R(\lambda_2)$ are emissivity, optical system response, and optical detector response, respectively, at the second wavelength. Equations (3) and (4) may be combined to yield a ratio pyrometry signal:

$$\frac{S_1(T)}{S_2(T)} = \frac{\epsilon(\lambda_1) K(\lambda_1) R(\lambda_1) \lambda_1^{-5} \exp\left(\frac{-C_2}{\lambda_1 T}\right)}{\epsilon(\lambda_2) K(\lambda_2) R(\lambda_2) \lambda_2^{-5} \exp\left(\frac{-C_2}{\lambda_2 T}\right)} \quad (5)$$

Solving Equation (5) for the temperature yields:

$$\frac{1}{T} = \quad (6)$$

$$\frac{\lambda_1 \lambda_2}{C_2(\lambda_1 - \lambda_2)} \left( \ln\left(\frac{S_2}{S_1}\right) + \ln\left(\frac{K(\lambda_1)}{K(\lambda_2)}\right) + \ln\left(\frac{R(\lambda_1)}{R(\lambda_2)}\right) + 5\ln\left(\frac{\lambda_2}{\lambda_1}\right) + \ln\left(\frac{\epsilon(\lambda_1)}{\epsilon(\lambda_2)}\right) \right)$$

The associated error $\delta T$ is given by:

$$\delta T = \frac{\lambda_1 \lambda_2 T^2 \ln\left(\frac{\epsilon(\lambda_1)}{\epsilon(\lambda_2)}\right)}{\lambda_1 \lambda_2 T \ln\left(\frac{\epsilon(\lambda_1)}{\epsilon(\lambda_2)}\right) + C_2(\lambda_1 - \lambda_2)} \quad (7)$$

Thus, in some embodiments, the two-wavelength ratio pyrometry measurement yields an accurate measurement of the temperature. In some embodiments, the ratio pyrometry concept is expanded to use the signals associated with more than two wavelengths. In some embodiments, ratio pyrometry is applied to pairs of signals associated with at least about 3, 4, 5, 6, 7, 8, 9, 10, 20, 30, 40, 50, 60, 70, 80, 900, 100, 200, 300, 400, 500, 600, 700, 800, 900, 1,000, or more wavelengths. In some embodiments, ratio pyrometry is applied to pairs of signals associated with at most about 1,000, 900, 800, 700, 600, 500, 400, 300, 200, 100, 90, 80, 70, 60, 50, 40, 30, 20, 10, 9, 8, 7, 6, 5, 4, or 3 wavelengths. In some embodiments, ratio pyrometry is applied to pairs of signals associated with a number of wavelengths that is within a range defined by any two of the preceding values.

For each pair of signals, the basic calculation described with respect to Equations (3)-(5) is performed. In some embodiments, the ratio obtained in Equation (5) is then compared with corresponding ratios obtained from the library of Planck curves. In some embodiments, this procedure is repeated for each pair of signals, allowing more accurate selection of the Planck curve from the library. In some embodiments, estimated temperatures and errors are determined for each pair of signals according to Equations (6) and (7) and a more accurate temperature is obtained by error-weighted averaging of these estimates.

In some embodiments, the controller comprises a processor and a memory coupled with the processor. In some embodiments, the memory is configured to provide the processor with instructions which when executed cause the processor to determine the temperature based upon the plurality of signals. In some embodiments, the controller comprises a processor configured to determine the temperature based upon the plurality of signals and a memory coupled to the processor. In some embodiments, the memory is configured to provide the processor with instructions to determine the temperature based upon the plurality of signals. In some embodiments, the controller comprises the computer system 300 described herein with respect to FIG. 3.

In some embodiments, the system 100 further comprises a second field stop 165 and a dual-position stage 167 coupled to the first field stop and to the second field stop. In some embodiments, the dual-position stage is configured: (i) to move the first field stop away from the image plane of the first lens and to move the second field stop substantially near the image plane of the first lens or (ii) to move the second field stop away from the image plane of the first lens and to move the first field stop substantially near the image plane of the first lens. In this manner, the first field stop associated with the temperature measurement may be replaced by the second field stop without requiring realignment of any other optical components described with respect to FIG. 1A, or vice versa. The second field stop may be associated with a fringe projection system. In this manner, the system 100 may be interchangeably operated in either a temperature measurement mode (using the first field stop) or a fringe projection mode (using the second field stop).

Figure 1B:
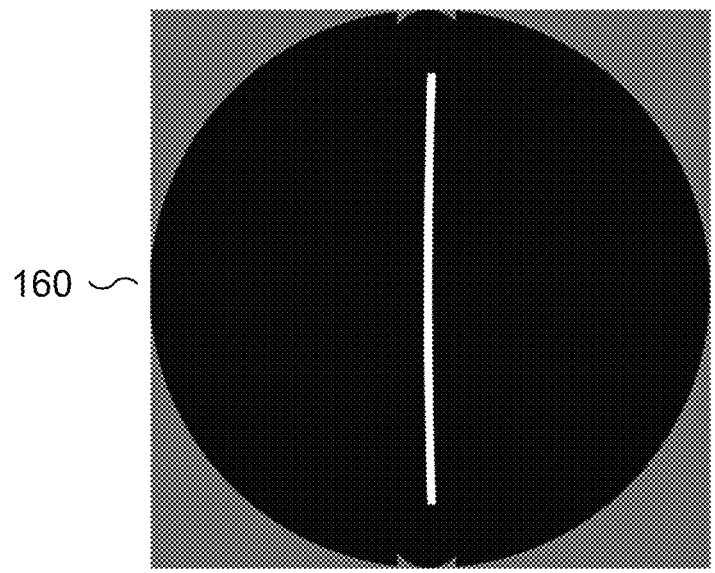
FIG. 1B shows a schematic depicting a first field stop.
Figure 1C:
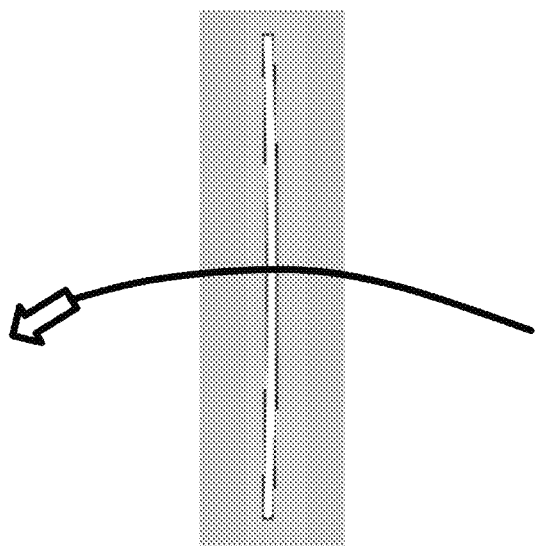
FIG. 1C shows a region of interest associated with the first field stop.

FIG. 1B shows a schematic depicting a first field stop 160. In the example shown, the first field stop may comprise a spatial filter with a relatively narrow width. In some embodiments, the relatively narrow width is chosen to improve spatial resolution in the azimuthal direction, as a narrow slit width for the first field stop may lead to a smaller (improved) spatial resolution in the direction of motion. Increasing the slit width may have the advantage of allowing more light through the system. Increasing the slit width may also make the spatial resolution larger in the direction of motion (azimuthal). This may be especially important in a rotation-based 3D printing system. FIG. 1C shows a region of interest associated with the first field stop. The arrow depicts the direction of rotation of a rotation-based 3D printing system.

Figure 1D:
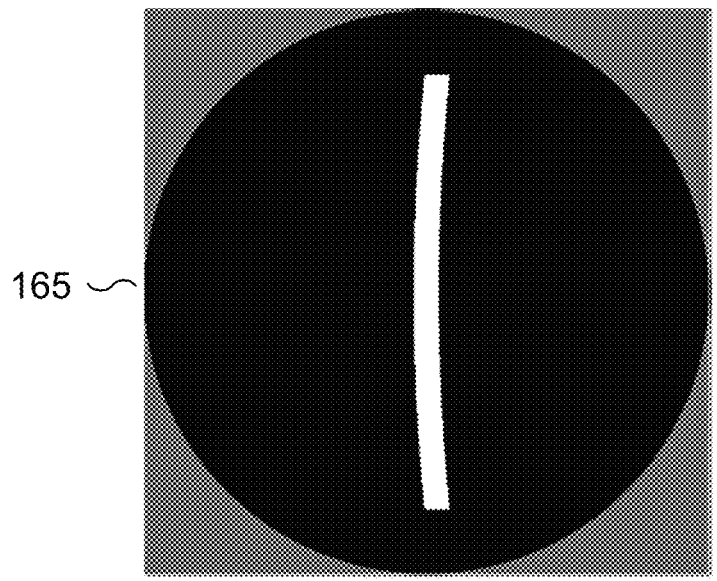
FIG. 1D shows a schematic depicting a second field stop.
Figure 1E:
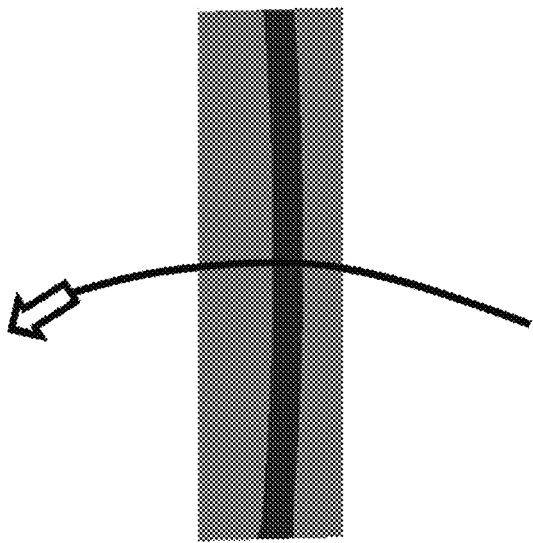
FIG. 1E shows a region of interest associated with the second field stop.

FIG. 1D shows a schematic depicting a second field stop 165. In the example shown, the second field stop may comprise a spatial filter with a relatively wide width. In some embodiments, the relatively wide width is chosen to match a size of an image of a region of interest on a 3D printed part or component. FIG. 1E shows a region of interest associated with the second field stop. The arrow depicts the direction of rotation of a rotation-based 3D printing system.

Returning to the description of FIG. 1A, in some embodiments, when operating in the temperature measurement mode, less light may be available than when operating in the fringe projection mode. In some embodiments, the light may also be distributed among different wavelengths in the spectrometer. In some embodiments, when operating in the fringe projection mode, it may be desirable to eliminate motion blur associated with, for example, movement of the part or component on a rotation-based 3D printing system. Thus, in some embodiments, a longer exposure time may be utilized when operating in the temperature measurement mode than when operating in the fringe projection mode. For example, in some embodiments, the temperature measurement mode may utilize an exposure time of at least about 1 millisecond (ms), 2 ms, 3 ms, 4 ms, 5 ms, 6 ms, 7 ms, 8 ms, 9 ms, 10 ms, 11 ms, 12 ms, 13 ms, 14 ms, 15 ms, 16 ms, 17 ms, 18 ms, 19 ms, 20 ms, or more. In some embodiments, the temperature measurement mode may utilize an exposure time of at most about 20 ms, 19 ms, 18 ms, 17 ms, 16 ms, 15 ms, 14 ms, 13 ms, 12 ms, 11 ms, 10 ms, 9 ms, 8 ms, 7 ms, 6 ms, 5 ms, 4 ms, 3 ms, 2 ms, 1 ms, or less. In some embodiments, the temperature measurement mode may utilize an exposure time that is within a range defined by any two of the preceding values. In some embodiments, the fringe projection mode may utilize an exposure time of at least about 0.1 ms, 0.2 ms, 0.3 ms, 0.4 ms, 0.5 ms, 0.6 ms, 0.7 ms, 0.8 ms, 0.9 ms, 1 ms, or more. In some embodiments, the fringe projection mode may utilize an exposure time of at most about 1 ms, 0.9 ms, 0.8 ms, 0.7 ms, 0.6 ms, 0.5 ms, 0.4 ms, 0.3 ms, 0.2 ms, 0.1 ms, or less. In some embodiments, the fringe projection mode may utilize an exposure time that is within a range defined by any two of the preceding values.

In some embodiments, when operating in the temperature measurement mode, the spatial resolution may be determined by the width of a slit in the first field stop. Thus, there may be a tradeoff between light level and spatial resolution when operating in the temperature measurement mode. Table 1 shows exemplary parameters associated with different slit widths in the first field stop.

TABLE 1

Parameters associated with different slit widths in the first field stop

| Width (mm) | ROI (mm) | Integration time (ms) | Limit blur (ms) | Slit size on sensor (mm) | Spectral overlap (nm) |
|---|---|---|---|---|---|
| 0.1 | 1.502 | 17.206 | 4.301 | 0.1667 | 3.7167 |
| 0.15 | 2.252 | 25.809 | 6.452 | 0.2500 | 5.5751 |
| 0.2 | 3.003 | 34.412 | 8.603 | 0.3333 | 7.4334 |
| 0.25 | 3.754 | 43.015 | 10.754 | 0.4167 | 9.2918 |
| 0.3 | 4.505 | 51.618 | 12.904 | 0.5000 | 11.1502 |

Figure 2:
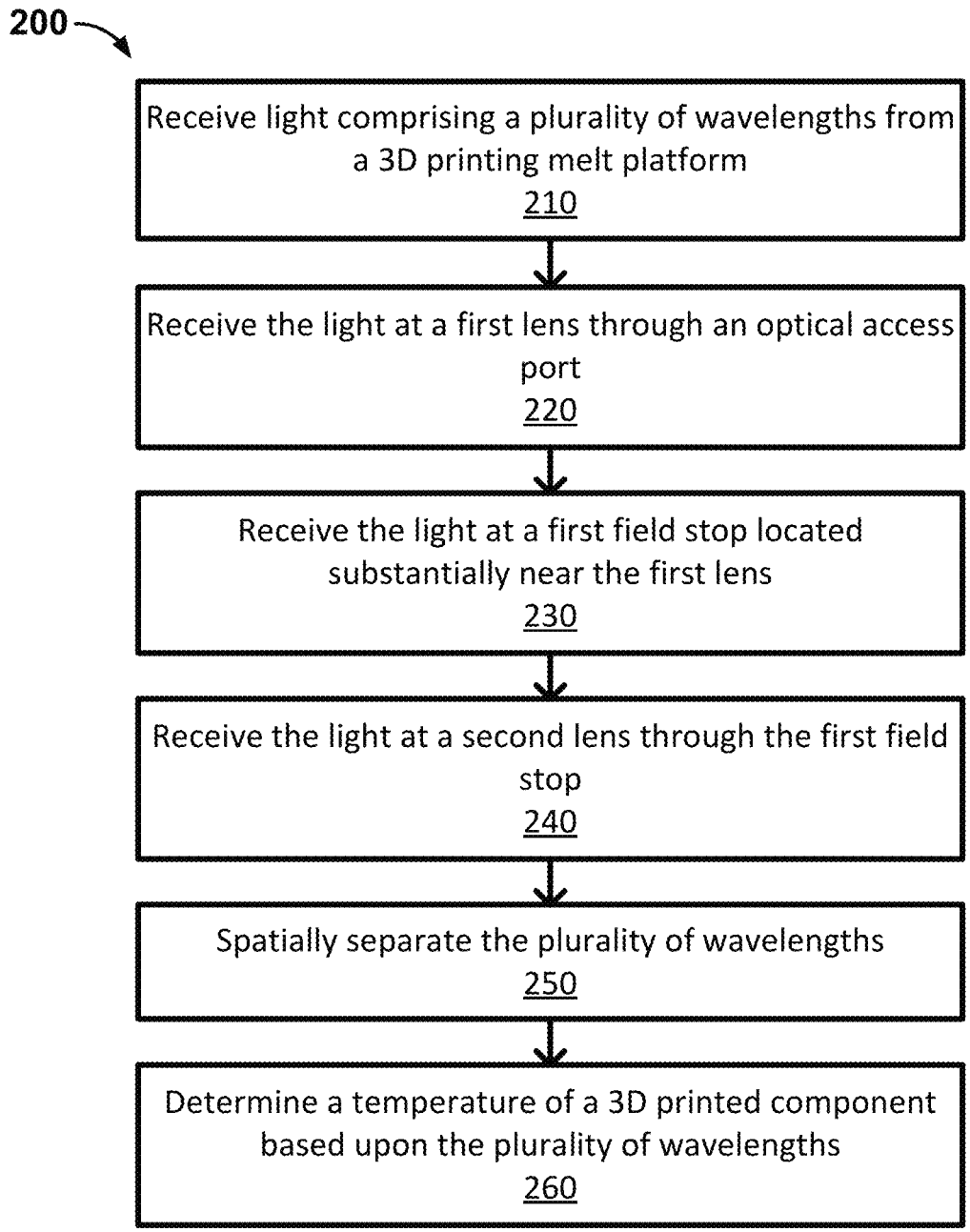
FIG. 2 shows a flowchart depicting an exemplary method for measuring blackbody radiation emitted during a 3D printing process.

The system 100 may be used to implement the method 200 described herein with respect to FIG. 2.

FIG. 2 shows a flowchart depicting an exemplary method 200 for measuring blackbody radiation emitted during a 3D printing process. In the example shown, light comprising a plurality of wavelengths is received from a 3D printing melt platform located within a closed container at 210. In some embodiments, the container is the container 110 described herein with respect to FIG. 1A. In some embodiments, the 3D printing melt platform is the 3D printing melt platform 120 described herein with respect to FIG. 2.

In the example shown, the light comprising the plurality of wavelengths is received at a first lens through an optical access port coupled to a wall of the closed container at 220. In some embodiments, the optical access port is the optical access port 140 described herein with respect to FIG. 1A. In some embodiments, the first lens is the first lens 150 described herein with respect to FIG. 1A.

In the example shown, the light comprising the plurality of wavelengths is received at a first field stop at 230. In some embodiments, the first field stop is located substantially near the first lens. In some embodiments, the first field stop is the first field stop 160 described herein with respect to FIG. 1A.

In the example shown, the light comprising the plurality of wavelengths is received at a second lens through the first field stop at 240. In some embodiments, the second lens is the second lens 155 described herein with respect to FIG. 1A.

In the example shown, the plurality of wavelengths from the second lens is spatially separated at 250. In some embodiments, the plurality of wavelengths is spatially separated by the wavelength separator 170 described herein with respect to FIG. 1A.

In the example shown, each wavelength of the plurality of wavelengths from is directed by the third lens 175 described herein with respect to FIG. 1A to the optical detector 180 described herein with respect to FIG. 1A.

In the example shown, each wavelength of the plurality of wavelengths is detected at 260. In some embodiments, each wavelength is detected by the optical detector 180 described herein with respect to FIG. 1A.

In some embodiments, the method 200 further comprises, prior to receiving the light comprising the plurality of wavelengths, directing energy to the 3D printing melt platform during the 3D printing process. In some embodiments, the energy is directed to the 3D printing melt platform by the energy source 130 described herein with respect to FIG. 1A.

In some embodiments, the method 200 further comprises determining a temperature of the 3D printed component based upon the plurality of wavelengths. In some embodiments, the temperature of the 3D printed component is determined by the controller 190 described herein with respect to FIG. 1A.

The method 200 may be implemented using any of the systems described herein, such as system 100 described herein with respect to FIG. 1A.

Additionally, systems are disclosed that can be used to perform the method 200 of FIG. 2, or any of operations 260 described herein. In some embodiments, the systems comprise one or more processors and memory coupled to the one or more processors. In some embodiments, the one or more processors are configured to implement one or more operations of method 200. In some embodiments, the memory is configured to provide the one or more processors with instructions corresponding to the operations of method 200. In some embodiments, the instructions are embodied in a tangible computer readable storage medium.

Figure 3:
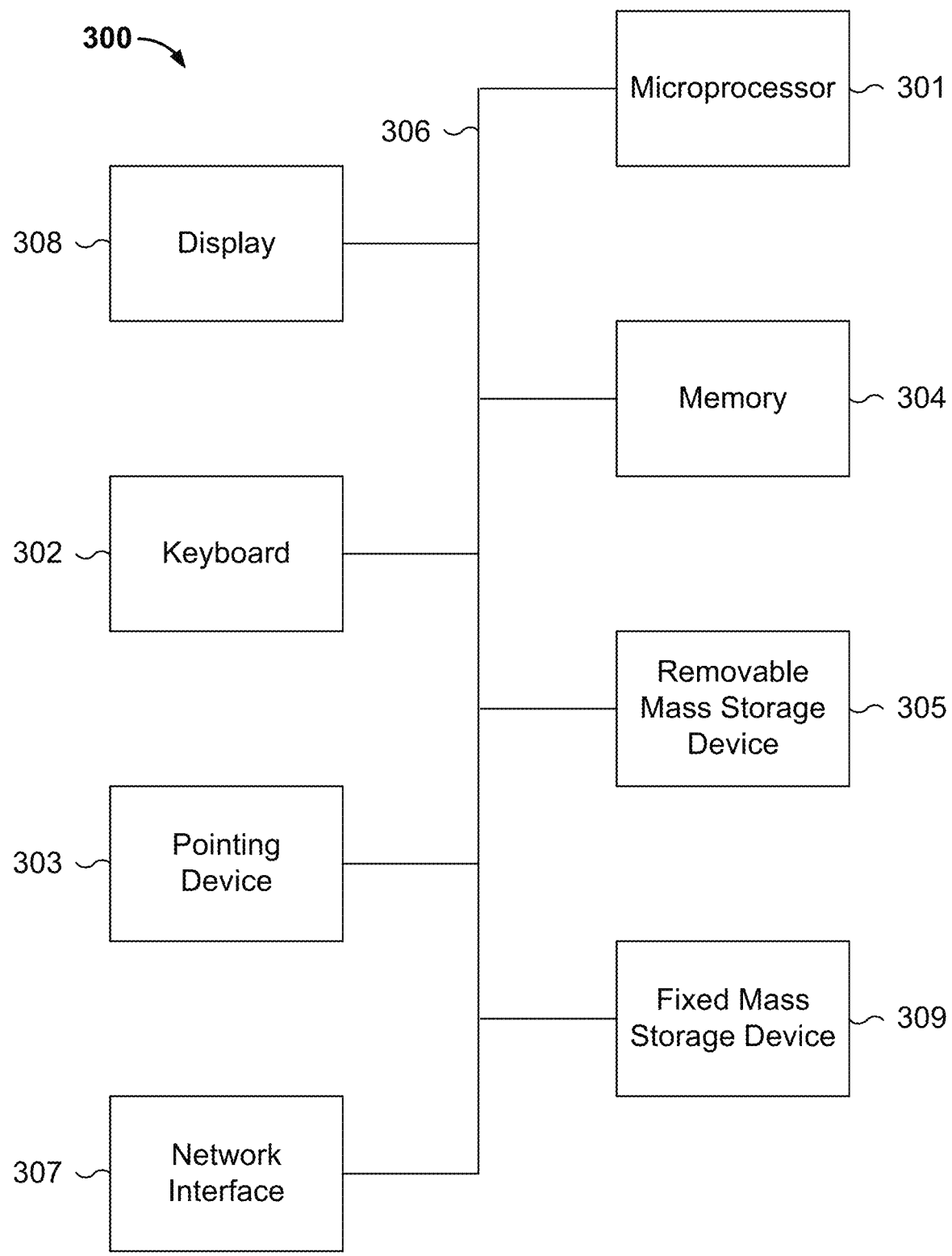
FIG. 3 shows a block diagram of a computer system for measuring blackbody radiation emitted during a 3D printing process.

FIG. 3 is a block diagram of a computer system 300 used in some embodiments to perform portions of methods for measuring blackbody radiation emitted during a 3D printing process described herein (such as operation 260 of method 200 as described herein with respect to FIG. 2). In some embodiments, the computer system may be utilized as a component in systems for measuring blackbody radiation emitted during a 3D printing process described herein. FIG. 3 illustrates one embodiment of a general purpose computer system. Other computer system architectures and configurations can be used for carrying out the processing of the present invention. Computer system 300, made up of various subsystems described below, includes at least one microprocessor subsystem 301. In some embodiments, the microprocessor subsystem 301 comprises at least one central processing unit (CPU) or graphical processing unit (GPU). The microprocessor subsystem can be implemented by a single-chip processor or by multiple processors. In some embodiments, the microprocessor subsystem is a general purpose digital processor which controls the operation of the computer system 300. Using instructions retrieved from memory 304, the microprocessor subsystem controls the reception and manipulation of input data, and the output and display of data on output devices.

The microprocessor subsystem 301 is coupled bi-directionally with memory 304, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also as well known in the art, primary storage typically includes basic operating instructions, program code, data and objects used by the microprocessor subsystem to perform its functions. Primary storage devices 304 may include any suitable computer-readable storage media, described below, depending on whether, for example, data access needs to be bi-directional or uni-directional. The microprocessor subsystem 301 can also directly and very rapidly retrieve and store frequently needed data in a cache memory (not shown).

A removable mass storage device 305 provides additional data storage capacity for the computer system 300, and is coupled either bi-directionally (read/write) or uni-directionally (read only) to microprocessor subsystem 301. Storage 305 may also include computer-readable media such as magnetic tape, flash memory, signals embodied on a carrier wave, PC-CARDS, portable mass storage devices, holographic storage devices, and other storage devices. A fixed mass storage 309 can also provide additional data storage capacity. The most common example of mass storage 309 is a hard disk drive. Mass storage 305 and 309 generally store additional programming instructions, data, and the like that typically are not in active use by the processing subsystem. It will be appreciated that the information retained within mass storage 305 and 309 may be incorporated, if needed, in standard fashion as part of primary storage 304 (e.g. RAM) as virtual memory.

In addition to providing processing subsystem 301 access to storage subsystems, bus 306 can be used to provide access to other subsystems and devices as well. In the described embodiment, these can include a display monitor 308, a network interface 307, a keyboard 302, and a pointing device 303, as well as an auxiliary input/output device interface, a sound card, speakers, and other subsystems as needed. The pointing device 303 may be a mouse, stylus, track ball, or tablet, and is useful for interacting with a graphical user interface.

The network interface 307 allows the processing subsystem 301 to be coupled to another computer, computer network, or telecommunications network using a network connection as shown. Through the network interface 307, it is contemplated that the processing subsystem 301 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 301 can be used to connect the computer system 300 to an external network and transfer data according to standard protocols. That is, method embodiments of the present invention may execute solely upon processing subsystem 301, or may be performed across a network such as the Internet, intranet networks, or local area networks, in conjunction with a remote processing subsystem that shares a portion of the processing. Additional mass storage devices (not shown) may also be connected to processing subsystem 301 through network interface 307.

An auxiliary I/O device interface (not shown) can be used in conjunction with computer system 300. The auxiliary I/O device interface can include general and customized interfaces that allow the processing subsystem 301 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter. The computer system shown in FIG. 3 is but an example of a computer system suitable for use with the invention. Other computer systems suitable for use with the invention may include additional or fewer subsystems. In addition, bus 306 is illustrative of any interconnection scheme serving to link the subsystems. Other computer architectures having different configurations of subsystems may also be utilized.

The invention claimed is:

1. A system comprising:
a closed container;
a three-dimensional (3D) printing melt platform located within the closed container and configured to support the production of a 3D printed component during a 3D printing process;
an energy source configured to direct energy to the 3D printing melt platform during the 3D printing process;
an optical access port coupled to a wall of the closed container and configured to receive light caused by the energy from the energy source, the light comprising a plurality of wavelengths;
a first lens configured to receive the light comprising the plurality of wavelengths from the optical access port;
a field stop located substantially near an image plane of the first lens and configured to receive the light comprising the plurality of wavelengths from the first lens;
a second lens configured to receive the light comprising the plurality of wavelengths from the field stop;
a wavelength separator configured to receive the light comprising the plurality of wavelengths from the second lens and to spatially separate the plurality of wavelengths; and
an optical detector comprising a plurality of pixels, each pixel configured to receive a wavelength of the plurality of wavelengths.

2. The system of claim 1, wherein the closed container comprises a gas-tight chamber.

3. The system of claim 1, wherein the closed container comprises a pressure chamber.

4. The system of claim 1, wherein the closed container comprises a vacuum chamber.

5. The system of any of claim 1, wherein the 3D printing process is selected from the group consisting of: metal powder bed fusion, direct metal laser sintering, selective laser melting, and electron beam melting.

6. The system of claim 1, wherein the energy source comprises a laser.

7. The system of claim 1, wherein the energy source comprises an electron-beam.

8. The system of claim 1, wherein the optical access port is located within the wall of the closed container.

9. The system of claim 1, wherein the optical access port is coupled to the wall of the closed container by a flange.

10. The system of claim 1, wherein the light comprises blackbody radiation emitted by the 3D printed component.

11. The system of claim 1, wherein each wavelength received by the pixels of the optical detector is within a range from 600 nanometers (nm) to 1,100 nm.

12. The system of claim 1, wherein the field stop comprises a spatial filter.

13. The system of claim 1, wherein the field stop comprises a first field stop comprising a first aperture of a first size and a second field stop comprising a second aperture of a second size that is different from the first size.

14. The system of claim 1, wherein the wavelength separator comprises a diffraction grating or a prism.

15. The system of claim 1, further comprising a controller coupled to the optical detector and configured to determine a temperature of the 3D printed component based upon a plurality of signals, each signal received from one or more pixels of the optical detector.

16. The system of claim 15, wherein the controller comprises:
a processor; and
a memory coupled with the processor, wherein the memory is configured to provide the processor with instructions which when executed cause the processor to determine the temperature based upon the plurality of signals.

17. The system of claim 15, wherein the controller comprises:
a processor configured to determine the temperature based upon the plurality of signals; and
a memory coupled to the processor and configured to provide the processor with instructions to determine the temperature based upon the plurality of signals.

18. The system of claim 1, wherein a size of an aperture of the field stop is changeable.

19. The system of claim 1, wherein the energy from the energy source passes through a first optical path that is different from a second optical path directed along an axis of the optical access port.

20. The system of claim 1, wherein at least one of the 3D printed component and the optical access port moves during the 3D printing process.

21. A method comprising:
receiving light comprising a plurality of wavelengths caused by an energy from an energy source, wherein the energy is directed towards a three-dimensional (3D) printing melt platform located within a closed container, the 3D printing melt platform configured to support the production of a 3D printed component during a 3D printing process;
receiving the light comprising the plurality of wavelengths at a first lens through an optical access port coupled to a wall of the closed container;
receiving the light comprising the plurality of wavelengths at a field stop located substantially near an image plane of the first lens;
receiving the light comprising the plurality of wavelengths at a second lens through the field stop;
spatially separating the plurality of wavelengths from the second lens; and
detecting each wavelength of the plurality of wavelengths.

22. The method of claim 21, further comprising, prior to receiving the light comprising the plurality of wavelengths, directing energy to the 3D printing melt platform during the 3D printing process.

23. The method of claim 21, further comprising determining a temperature of the 3D printed component based upon the plurality of wavelengths.

24. The method of claim 21, wherein a size of an aperture of the field stop is changeable.

25. The method of claim 21, wherein the energy from the energy source passes through a first optical path that is different from a second optical path directed along an axis of the optical access port.

26. The method of claim 21, wherein at least one of the 3D printed component and the optical access port moves during the 3D printing process.

27. The method of claim 21, wherein the field stop comprises a first field stop comprising a first aperture of a first size and a second field stop comprising a second aperture of a second size that is different from the first size.

* * * * *